(12) United States Patent
Weh et al.

(10) Patent No.: US 11,851,044 B2
(45) Date of Patent: Dec. 26, 2023

(54) PEDAL TRAVEL SIMULATOR, AND HYDRAULIC BLOCK COMPRISING A PEDAL TRAVEL SIMULATOR

(71) Applicant: Robert Bosch GmbH, Stuttgart (DE)

(72) Inventors: Andreas Weh, Sulzberg (DE); Martin Hagspiel, Rettenberg (DE); Harald Guggenmos, Immenstadt/Seifen (DE)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 17/607,318

(22) PCT Filed: Apr. 3, 2020

(86) PCT No.: PCT/EP2020/059512
§ 371 (c)(1),
(2) Date: Oct. 28, 2021

(87) PCT Pub. No.: WO2020/224883
PCT Pub. Date: Nov. 12, 2020

(65) Prior Publication Data
US 2022/0203948 A1      Jun. 30, 2022

(30) Foreign Application Priority Data
May 9, 2019   (DE) ...................... 10 2019 206 660.7

(51) Int. Cl.
*B60T 8/40*   (2006.01)
*F15B 7/06*   (2006.01)
*F15B 19/00*  (2006.01)

(52) U.S. Cl.
CPC ................ *B60T 8/409* (2013.01); *F15B 7/06* (2013.01); *F15B 19/007* (2013.01)

(58) Field of Classification Search
CPC ........ B60T 7/042; B60T 8/363; B60T 8/4081; B60T 8/409
See application file for complete search history.

(56) References Cited

U.S. PATENT DOCUMENTS

2018/0362006 A1* 12/2018 Weh ........................ F15B 15/24

FOREIGN PATENT DOCUMENTS

| CN | 207173574 U | 4/2018 | |
| CN | 108032848 A | 5/2018 | |
| DE | 102016210949 A1 | 12/2017 | |
| DE | 102016222562 A1 * | 5/2018 | ............. B60T 8/409 |
| DE | 102017209618 A1 * | 12/2018 | |
| JP | 2010000925 A | 1/2010 | |
| JP | 2016188006 A | 11/2016 | |
| WO | 2018091195 A1 | 5/2018 | |

OTHER PUBLICATIONS

International Search Report for PCT/EP2020/059512, dated May 28, 2020.

* cited by examiner

*Primary Examiner* — Abiy Teka
(74) *Attorney, Agent, or Firm* — NORTON ROSE FULBRIGHT US LLP; Gerard Messina

(57) ABSTRACT

A pedal travel simulator for a hydraulic powered vehicle braking system. In order to realize a "jump-in," a first piston spring is provided that, after a first displacement path, loads a simulator piston of the pedal travel simulator with a spring force that is higher by a multiple than that of a second piston spring that loads the simulator piston during the first displacement path.

11 Claims, 2 Drawing Sheets

PEDAL TRAVEL SIMULATOR, AND HYDRAULIC BLOCK COMPRISING A PEDAL TRAVEL SIMULATOR

FIELD

The present invention relates to a pedal travel simulator, and to a hydraulic block for a hydraulic powered vehicle brake system.

BACKGROUND INFORMATION

In powered hydraulic vehicle brake systems, pedal travel simulators enable a pedal travel (in the case of the hand brake, a lever travel) when a master brake cylinder is actuated. When there is a powered actuation, the master brake cylinder acts as setpoint generator for a hydraulic brake pressure that is not produced by the master brake cylinder, but rather by external energy, for example a hydraulic pump. When there is a power braking, the master brake cylinder is separated hydraulically from the rest of the vehicle brake system, for example by closing a valve, and when it is actuated displaces brake fluid into the pedal travel simulator, which communicates with the master brake cylinder during the power braking.

PCT Patent Application WO 2018/091 195 A1 describes a hydraulic block for a powered hydraulic vehicle brake system. The hydraulic block is a narrow, cuboidal metal block in which a pedal travel simulator is integrated. For this purpose, in a narrow side of the hydraulic block a cylindrical blind hole is made in which a simulator piston is accommodated so as to be axially displaceable. The blind hole is sealed in pressure-tight fashion with a cylinder cover that has a cylindrical tube shape and is closed at one end, in which a plate spring assembly is situated as piston spring that loads the simulator piston in the direction of a base of the blind hole in the hydraulic block. At the base of the blind hole, a bore opens that leads in the hydraulic block to a master brake cylinder bore. The hydraulic block, or a region of the hydraulic block surrounding the blind hole, forms a simulator cylinder of the pedal travel simulator, of which the simulator piston, the piston spring, and the cylinder cover are also parts.

SUMMARY

A pedal travel simulator according to an example embodiment of the present invention has a simulator piston that is displaceable in a simulator cylinder and that is loaded by a first piston spring in the direction of a closed end of the simulator cylinder. The first piston spring is situated in a hollow cylinder cover that seals an open end of the simulator cylinder, preferably in fluid-tight and pressure-resistant fashion. "Hollow" means a shape of the cylinder cover that is suitable to receive the piston spring and that may extend the simulator cylinder. The cylinder cover for example has a cylindrical tube shape, and has an open end and a closed end. A multifunction part, for example in the form of a perforated disk, is fastened on a side of the first piston spring facing the simulator cylinder, on or in the cylinder cover, and holds the first piston spring in the cylinder cover. The multifunction part is fluid-permeable, so that brake fluid can flow from the simulator cylinder into the cylinder cover and vice versa.

Between the first piston spring and the simulator piston there is situated a spacer element that extends through the multifunction part and that is pressed in the direction of the simulator piston by the first piston spring. After a first displacement path of the simulator piston, the spacer element transmits a spring force of the first piston spring to the simulator piston, and loads the simulator piston in the direction of the closed end of the simulator cylinder. The first displacement path is a part of a piston stroke of the simulator piston at a beginning of the piston stroke, in which the simulator piston is situated at or near the closed end of the simulator cylinder.

A second piston spring of the pedal travel simulator also loads the simulator piston during the first displacement path in the direction of the closed end of the simulator cylinder; here the second piston spring can also load the simulator piston in the direction of the closed end of the simulator cylinder during another piston stroke. During the first displacement path at the beginning of the piston stroke, the second piston spring, and not the first piston spring, loads the simulator piston in the direction of the closed end of the simulator cylinder, so that a spring force acting on the simulator piston counter to the direction of displacement of the simulator piston during the first displacement path is smaller than during the rest of the piston stroke, in which the stronger, first piston spring presses the simulator piston, via the spacing element, in the direction of the closed end of the simulator cylinder. In this way, a so-called "jump-in" is realized or simulated.

The "jump-in" is a low pedal force or lever force at the beginning of a muscular force actuation of a master brake cylinder that lasts approximately until friction brake pads of all wheel brakes lie against brake disks, brake drums, or other brake elements. During the "jump-in," essentially only a reset spring in the master brake cylinder counteracts a pressing down of a foot brake pedal, a pulling of a hand brake lever, or in general a movement of an actuating element of the master brake cylinder. If the frictional brake pads of the wheel brakes are lying against the brake elements, a further displacement of a master brake cylinder piston in the master brake cylinder produces a hydraulic pressure that noticeably increases an actuating force. The pedal travel simulator according to the present invention achieves the noticeable force increase when, at the end of the first displacement path of the simulator piston, the first piston spring pushes the simulator piston in the direction of the closed end of the simulator cylinder, which first spring does not act on the simulator piston during the first displacement path.

At or near its closed end, the simulator cylinder has a connection for a master brake cylinder that can also be understood as an inlet and outlet of the cylinder of the pedal travel simulator, and through which the simulator cylinder communicates with the master brake cylinder.

Advantageous embodiments and developments of the present invention are disclosed herein.

Preferably, the pedal travel simulator is integrated in a hydraulic block of a slip controller of a hydraulic vehicle brake system, in particular a powered vehicle brake system. Such hydraulic blocks are conventional; they are standardly cuboidal metal blocks that are bored corresponding to a hydraulic circuit plan of the vehicle brake system, or of the slip controller of a vehicle brake system. The hydraulic blocks are equipped with magnetic valves, hydraulic pumps, and further hydraulic components of the slip controller. Such hydraulic blocks are conventional and are not explained in more detail here.

All features disclosed in the description herein and the figures may be realized individually or in any combination in specific embodiments of the present invention. Embodiments of the present invention that do not include all, but only one or some of a specific embodiment of the present invention are possible.

BRIEF DESCRIPTION OF THE DRAWINGS

Below, the present invention is explained in more detail on the basis of a specific embodiment shown in the figures.

DETAILED DESCRIPTION OF EXAMPLE EMBODIMENTS

Figure 1:
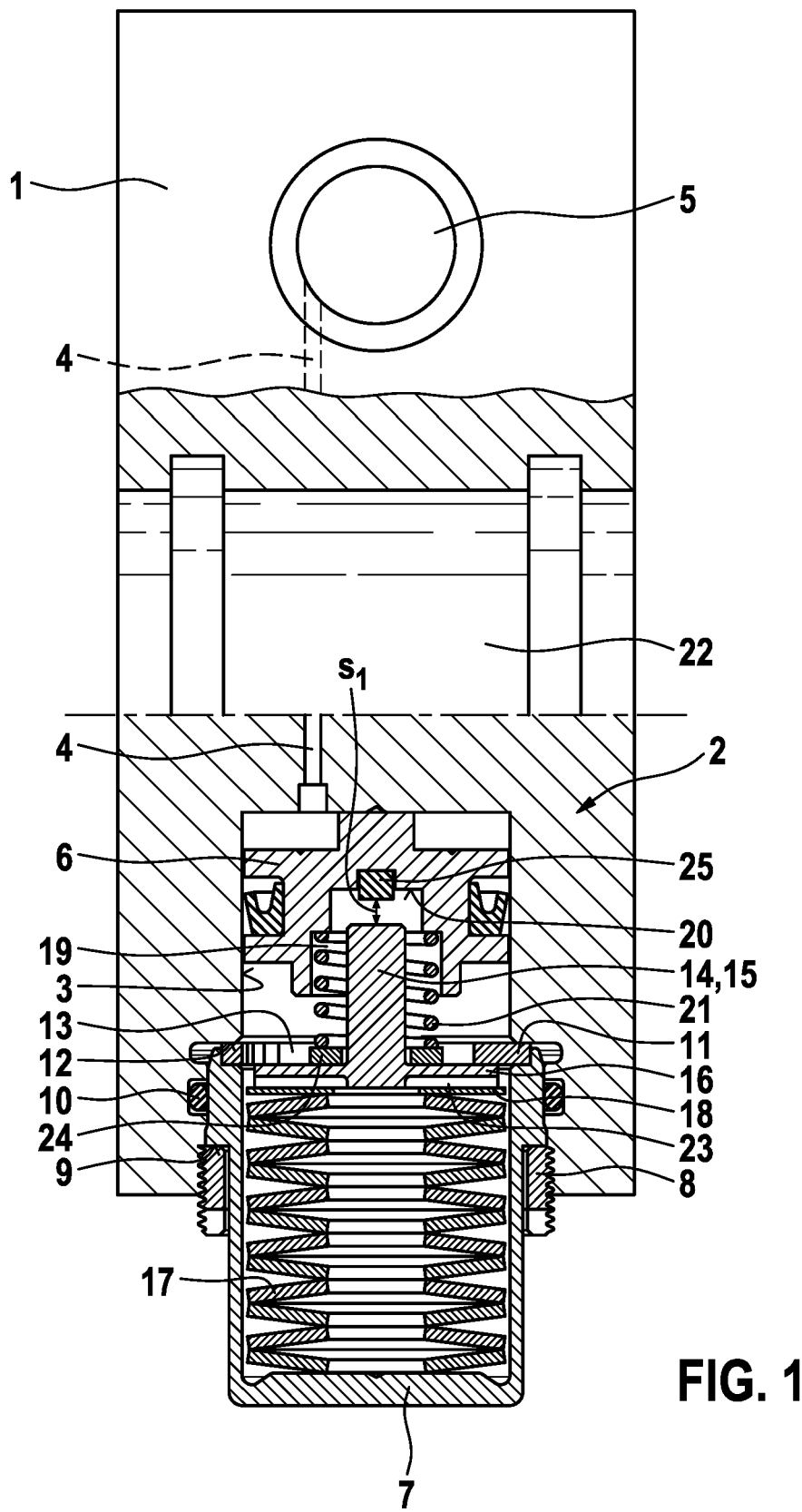
FIG. 1 shows a section of a hydraulic block of a slip controller of a hydraulic powered vehicle brake system having a pedal travel simulator according to an example embodiment of the present invention.
Figure 2:
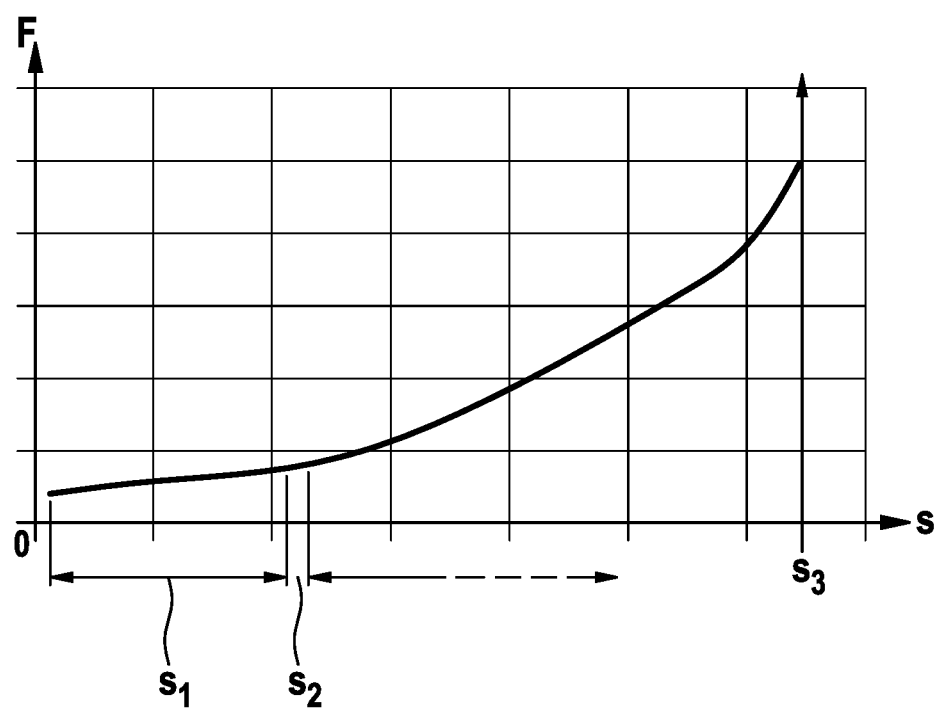
FIG. 2 shows a force-path diagram.

Hydraulic block 1 according to the present invention, shown in FIGS. 1 and 2, is provided for a slip controlling and for a powered actuation of a hydraulic powered vehicle brake system otherwise not shown. Hydraulic block 1 is a cuboidal metal block that is shown unequipped, with the exception of a pedal travel simulator 2 that is to be described. In the depicted and described specific embodiment, hydraulic block 1 is made of light metal, namely an aluminum alloy. Hydraulic block 1 has a boring, not visible in the drawing, corresponding to a hydraulic circuit plan of the vehicle brake system. The block is equipped with hydraulic components (not shown) for powered actuation and slip controlling, such as magnetic valves, a master brake cylinder having one or more pistons, a powered cylinder having a powered piston, and pedal travel simulator 2, which are hydraulically connected by the boring corresponding to the hydraulic circuit plan of the vehicle brake system. Because a master brake cylinder is integrated in hydraulic block 1, only hydraulic wheel brakes may be connected to hydraulic block 1 via brake lines. Such hydraulic blocks 1 are conventional and are not explained in more detail here.

Hydraulic block 1 has a cylindrical blind hole as simulator cylinder 3 of pedal travel simulator 2 according to the present invention, at whose base a bore opens as connection 4 for the master brake cylinder. The bore that forms connection 4 connects simulator cylinder 3 of pedal path simulator 2 hydraulically to a master brake cylinder bore 5 into which a master brake cylinder or master brake cylinder liner (not shown) is pressed, or master brake cylinder bore 5 forms the master brake cylinder. A simulator piston 6 is accommodated in simulator cylinder 3 in axially displaceable fashion.

A cylinder cover 7 that stands out from hydraulic block 1 is set into an opening at an open end of simulator cylinder 3 of pedal travel simulator 2. In the exemplary embodiment, cylinder cover 7 has a cylindrical tube shape and has an open end oriented towards simulator cylinder 3 and a closed end. A threaded ring 8 that is screwed into an inner threading in the opening of simulator cylinder 3 holds cylinder cover 7 on an annular step 9 that runs externally around cylinder cover 7, in the manner of a coupling nut. A sealing ring 10 that is set into a circumferential groove in the opening of simulator cylinder 3 seals between cylinder cover 7 and simulator cylinder 3, so that simulator cylinder 3 is sealed in pressure-tight fashion.

A perforated disk, as multifunction part 11, is fastened on or in the open side of cylinder cover 7. In the exemplary embodiment, the perforated disk forming multifunction part 11 is pressed into a circumferential annular step in an end rim of cylinder cover 7, at its open end. In the opening of simulator cylinder 3, the perforated disk forming multifunction part 11 is supported on a circumferential annular step 12, so that multifunction part 11 is axially fixed. Through a center hole 13, multifunction part 11 is permeable to fluid, so that brake fluid can flow through in both directions.

A tappet 14 of a spacer element 15 passes through center hole 13 of multifunction part 11. Spacer 15 has a circular disk-shaped foot 16 from which tappet 14 stands out coaxially. Foot 16 of spacer 15 is situated in cylinder cover 7, and has a larger diameter than center hole 13 of multifunction part 11, so that multifunction part 11 holds foot 16 of spacer 15 in cylinder cover 7 and holds spacer 15 on cylinder cover 7. In the exemplary embodiment, spacer 15 is a component separate from simulator piston 6.

In cylinder cover 7, a plate spring assembly is situated as first piston spring 17, which is supported on the closed end of cylinder cover 7 and presses against foot 16 of spacer 15. A perforated disk 18 is situated between first piston spring 17 and foot 16 of spacer 15. First piston spring 17 is supported on the closed end of cylinder cover 7 and presses foot 16 of spacer 15 against multifunction part 11, which holds foot 16, perforated disk 18, and the plate spring assembly that forms piston spring 17 in cylinder cover 7. Via its foot 16, multifunction part 11 holds spacer 15 on cylinder cover 7. In an end face oriented towards perforated disk 18, foot 16 of spacer 15 has radial channels 23 that extend up to a center hole of perforated disk 18, so that brake fluid can flow from simulator cylinder 3 through multifunction part 11, externally around foot 16 of spacer 15, and through radial channels 23 and the center hole of perforated disk 18 into cylinder cover 7, and vice versa. The center hole of multifunction part 11 is star-shaped, so that brake fluid can also flow past foot 16 of spacer 15 when foot 16 is seated on multifunction part 11.

Cylinder cover 7 forms, with first piston spring 17, spacer 15, and multifunction part 11, which holds first piston spring 17 in cylinder cover 7 and holds spacer 15 on cylinder cover 7, a pre-installation assembly that is put together independently of the other parts, is handled as a single part, and can be assembled to pedal travel simulator 2 by attaching it to the opening of simulator cylinder 3 of pedal travel simulator 2.

Tappet 14 of spacer 15 extends into a coaxial, diameter-stepped countersink 19 in simulator piston 6. As can be seen in the drawing, tappet 14, or spacer 15, are made short enough that a distance between tappet 14 and an annular step 20 in countersink 19 is present when simulator piston 6 lies against the closed end of simulator cylinder 3. As a result, simulator piston 6 has a first displacement path $s_1$ by which simulator piston 6 can move in simulator cylinder 3 before it impacts, with its annular step 20, against tappet 14 of spacer 15, and is loaded, via spacer 15, with a spring force of first piston spring 17 that is oriented in the direction of the closed end of simulator cylinder 3.

Between foot 16 of spacer 15 and simulator piston 6, a helical pressure spring is situated, as second piston spring 21, that surrounds tappet 14 of spacer 15 and whose one end is supported via a distancing ring 24 on foot 16 of spacer 15, and whose other end is supported on annular step 20 in countersink 19 in simulator piston 6. During first displacement path $s_1$, second piston spring 21 loads simulator piston 6 with a spring force directed in the direction of the closed end of simulator cylinder 3. The cylindrical segment of countersink 19 in simulator piston 6 forms a receptacle, or a kind of guide, for second piston spring 21.

The plate spring assembly forming first piston spring 17 has a greater spring stiffness and a higher spring constant than does the helical pressure spring forming second piston spring 21. Moreover, first piston spring 17 is held between multifunction part 11 and the closed end of cylinder cover 7 with a greater pre-tension than that with which second piston spring 21 is held between simulator piston 6 and foot 16 of spacer 15.

An operational braking takes place as a powered braking in which a brake pressure is produced by an electrohydraulic powered brake pressure producer (not shown) whose powered cylinder or powered cylinder liner (not shown) is pressed into a powered cylinder bore 22 in hydraulic block 1, or whose powered cylinder forms powered cylinder bore 22. The powered brake pressure producer has a powered piston (not shown) in the powered cylinder that is displaced by an electric motor (not shown) that is attached externally on hydraulic block 1, coaxially to simulator cylinder 3, via a mechanical step-down gear mechanism and a screw drive in the powered cylinder.

The master brake cylinder (not shown) is hydraulically separated from the vehicle brake system by closing a magnetic valve (also not shown) that is also situated in hydraulic block 1, and it acts as setpoint generator for the brake pressure to be produced and/or for the wheel brake pressure to be regulated. By opening a magnetic valve (not shown) situated in hydraulic block 1, which valve is situated in the bore in hydraulic block 1 that forms the connection 4 of pedal travel simulator 2 to the master brake cylinder, pedal travel simulator 2 communicates with the master brake cylinder, so that when there is a muscular force actuation of the master brake cylinder brake fluid is displaced from the master brake cylinder into the simulator cylinder 3 of pedal travel simulator 2.

The brake fluid displaced out of the master brake cylinder first displaces simulator piston 6 in simulator cylinder 3 against a low spring force of second piston spring 21, until, at the end of first displacement path $s_1$, simulator piston 6 (more precisely, annular step 20 in countersink 19 of simulator piston 6) impacts against tappet 14 of spacer 15. The low spring force acting on simulator piston 6 during first displacement path $s_1$ simulates a so-called "jump-in." The "jump-in" is a low actuation force at the beginning of a muscular force actuation of a master brake cylinder.

When, at the end of first displacement path $s_1$, simulator piston 6 impacts against tappet 14 of spacer 15, in its further displacement simulator piston 6 compresses first piston spring 21 via spacer 15. Because the spring force of first piston spring 21 is greater than the spring force of second piston spring 17, the spring force acting on simulator piston 6 increases when there is a further displacement of simulator piston 6.

In the exemplary embodiment, during first displacement path $s_1$ of simulator piston 6 second piston spring 21 produces a linear increase in force with a small slope, as is shown in FIG. 2. When there is a further displacement of simulator piston 6, the stronger, first piston spring 17 produces a steeper increase in force, which is progressive in the exemplary embodiment.

A length of displacement path $s_1$, which simulates the so-called "jump-in," is adjustable via the length of tappet 14 and a depth of countersink 19 in simulator piston 6. A spring force, or a steepness of the force increase, is adjustable via a spring stiffness of second piston spring 21 and by omitting distance ring 24 between second piston spring 21 and foot 16 of spacer 15, via a thinner or a thicker distance ring 24, or via a plurality of distance rings 24.

At point $s_3$ in the force-path diagram of FIG. 2, simulator piston 6 impacts against multifunction part 11, which terminates the piston stroke. The force decreases in perpendicular fashion there without further movement of simulator piston 6.

In order to prevent a hard impact of spacer 15 on simulator piston 6, a rubber-elastic element, here designated in generalized fashion as elasticity 25, is situated in countersink 19 of simulator piston 6. Elasticity 25 provides a soft transition from first displacement path $s_1$ to the further displacement of simulator piston 6, which is designated $s_2$ in the force-path diagram of FIG. 2.

Spacer 15, or its tappet 14, is long enough that it ensures a minimum distance between annular step 20 in countersink 19 of simulator piston 6, which forms a countersupport for second piston spring 21, and foot 16 of spacer 15 on which second piston spring 21 is supported, that is longer than a minimum length of second piston spring 21. Second piston spring 21, which is a helical pressure spring in the exemplary embodiment, has its minimum length when its windings lie against one another. This lying against one another of the windings of second piston spring 21, which can also be understood as a "bottoming out" of second piston spring 21, is prevented by spacer 15 through the length of its tappet 14.

Multifunction part 11, which in the exemplary embodiment is a perforated disk situated in axially fixed fashion in simulator 3 between simulator piston 6 and first piston spring 7, also forms a stroke limiter for simulator piston 6 that limits a stroke of simulator piston 6. In the exemplary embodiment, the stroke limiter is selected such that it prevents a "bottoming out" of first piston spring 17. A "bottoming out" of first piston spring 17 would be a compression of the plate springs of the plate spring assembly forming first piston spring 17, so that the plate springs lie flat against one another and do not lie against one another only at their outer or inner circumferential edges, and/or plate springs are pressed flat or snap over into an oppositely oriented curvature.

As stated, hydraulic block 1 has master brake cylinder bore 5, which in the specific embodiment is diameter-stepped and has circumferential grooves. A master brake cylinder (not shown) is pressed into master brake cylinder bore 5, into which cylinder one or more master brake cylinder pistons (not shown) are set, of which for an actuation of the master brake cylinder, or the vehicle brake system, one is displaceable with a brake pedal (not shown) and the other simulator piston or pistons are displaceable through the application of pressure.

For the powered actuation, hydraulic block 1 has powered cylinder bore 22 that is situated in a different sectional plane than pedal travel simulator 2, and of which only a half section is therefore visible in FIG. 1. In the Figures, the section is offset in such a way that pedal travel simulator 2 is visible in axial section and powered cylinder bore 22 is visible as a half section. The bore in hydraulic block 1 forming connection 4 of simulator cylinder 3 of pedal travel simulator 2 at the master brake cylinder, which bore can also be angled off, runs past powered cylinder bore 22 without intersecting it, and opens into master brake cylinder bore 5, or intersects it, so that simulator cylinder 3 communicates with master brake cylinder bore 5.

What is claimed is:

1. A pedal travel simulator for a hydraulic powered vehicle brake system, comprising:
    a simulator cylinder having a hydraulic connection at a closed end of the simulator cylinder by which the simulator cylinder communicates with a master brake cylinder;

a simulator piston that is displaceable in the simulator cylinder;

a hollow cylinder cover that closes an open end of the simulator cylinder;

a first piston spring that is situated in the hollow cylinder cover;

a multifunction part that is fastened on a side, facing the simulator cylinder, of the first piston spring on or in the cylinder cover, the multifunction part being configured to permit fluid to flow from the cylinder cover into the simulator cylinder and from the simulator cylinder into the cylinder cover, and holds the first piston spring in the cylinder cover;

wherein between the first piston spring and the simulator piston, a spacer is situated that extends through the multifunction part, that is loaded by the first piston spring in a direction of the simulator piston, and that, after a first displacement path of the simulator piston, transmits a spring force of the first piston spring to the simulator piston, and wherein the pedal travel simulator includes a second piston spring that, during the first displacement path, loads the simulator piston in a direction of the closed end of the simulator cylinder.

2. The pedal travel simulator as recited in claim 1, wherein the first piston spring has a plate spring or a plate spring assembly, and/or the second piston spring is a helical spring.

3. The pedal travel simulator as recited in claim 1, wherein the second piston spring is a helical spring, and the spacer extends through the second piston spring, and the spacer ensures a minimum distance of the simulator piston from a counter-support of the second piston spring that is greater than a minimum length of the second piston spring.

4. The pedal travel simulator as recited in claim 1, wherein the simulator piston has a countersink in its end oriented toward the first piston spring, in which an end of the second piston spring is received.

5. The pedal travel simulator as recited in claim 1, wherein the spacer has a disk that is situated between the first piston spring and the multifunction part and from which a tappet stands out in a direction of the simulator piston, wherein the tappet passes through the multifunction part and impacts against the simulator piston at an end of the first displacement path.

6. The pedal travel simulator as recited in claim 1, wherein the multifunction part is a perforated disk that is fastened at an opening of the cylinder cover.

7. The pedal travel simulator as recited in claim 1, wherein the cylinder cover, the multifunction part fastened to the cylinder cover, the first piston spring, and the spacer, which are held in the cylinder cover by the multifunction part, form an assembly.

8. The pedal travel simulator as recited in claim 1, wherein a length of the first displacement path of the simulator piston is adjustable via a length of the spacer and/or a depth of a countersink in the simulator piston.

9. The pedal travel simulator as recited in claim 1, wherein the pedal travel simulator has an elasticity between the spacer and the simulator piston.

10. A hydraulic block for a hydraulic powered vehicle brake system comprising a pedal travel simulator, the pedal travel simulator including:

a simulator cylinder having a hydraulic connection at a closed end of the simulator cylinder by which the simulator cylinder communicates with a master brake cylinder;

a simulator piston that is displaceable in the simulator cylinder;

a hollow cylinder cover that closes an open end of the simulator cylinder;

a first piston spring that is situated in the hollow cylinder cover;

a multifunction part that is fastened on a side, facing the simulator cylinder, of the first piston spring on or in the cylinder cover, the multifunction part being configured to permit fluid to flow from the cylinder cover into the simulator cylinder and from the simulator cylinder into the cylinder cover, and holds the first piston spring in the cylinder cover;

wherein between the first piston spring and the simulator piston, a spacer is situated that extends through the multifunction part, that is loaded by the first piston spring in a direction of the simulator piston, and that, after a first displacement path of the simulator piston, transmits a spring force of the first piston spring to the simulator piston, and wherein the pedal travel simulator includes a second piston spring that, during the first displacement path, loads the simulator piston in a direction of the closed end of the simulator cylinder; and wherein the simulator cylinder is fashioned as a hole in the hydraulic block.

11. The hydraulic block as recited in claim 10, wherein the hydraulic block has a master brake cylinder bore and/or a powered cylinder bore.

* * * * *